United States Patent
DiSanto et al.

(10) Patent No.: US 7,222,242 B2
(45) Date of Patent: May 22, 2007

(54) INTERFACE FOR FACILITATING FACSIMILE TRANSMISSIONS VIA WIRELESS COMMUNICATIONS NETWORKS

(75) Inventors: Frank J. DiSanto, North Hills, NY (US); Denis A. Krusos, Lloyd Harbor, NY (US); Kao-Yih Lee, Smithtown, NY (US); Roland H. Feibert, Syosset, NY (US)

(73) Assignee: Copytele, Inc., Melville, NY (US)

( * ) Notice: Subject to any disclaimer, the term of this patent is extended or adjusted under 35 U.S.C. 154(b) by 215 days.

(21) Appl. No.: 11/100,669

(22) Filed: Apr. 7, 2005

(65) Prior Publication Data

US 2005/0180253 A1  Aug. 18, 2005

Related U.S. Application Data

(63) Continuation-in-part of application No. 11/058,742, filed on Feb. 15, 2005, which is a continuation of application No. 10/096,811, filed on Mar. 13, 2002, now Pat. No. 6,856,686, application No. 11/100,669, which is a continuation-in-part of application No. 10/162,800, filed on Jun. 5, 2002, now Pat. No. 6,856,687, which is a continuation-in-part of application No. 09/336,948, filed on Jun. 21, 1999, now Pat. No. 6,430,691.

(51) Int. Cl.
*H04L 9/00* (2006.01)
(52) U.S. Cl. ........................ 713/192; 380/243; 380/266; 380/257
(58) Field of Classification Search ................ 713/192; 380/243, 266, 257
See application file for complete search history.

(56) References Cited

U.S. PATENT DOCUMENTS

| | | | |
|---|---|---|---|
| 4,581,746 A | 4/1986 | Arnold | |
| 5,166,977 A | 11/1992 | Ross | |
| 5,222,136 A | 6/1993 | Rasmussen et al. | |
| 5,253,293 A | 10/1993 | Shigemitsu et al. | |
| 5,410,599 A | 4/1995 | Crowley et al. | |
| 5,455,861 A | 10/1995 | Faucher et al. | |
| 5,594,798 A | 1/1997 | Cox et al. | |
| 5,621,800 A | 4/1997 | Weng et al. | |

(Continued)

OTHER PUBLICATIONS

Central Semiconductor 1.0 Amp Surface Mount Silicon Schottky Rectifier Data Sheet.

(Continued)

*Primary Examiner*—Thomas R. Peeso
(74) *Attorney, Agent, or Firm*—Plevy, Howard & Darcy, PC (57) ABSTRACT

An interface for facilitating facsimile transmission via a wireless communications device operatively connected to a wireless communications network, including: a modem suitable for being communicatively coupled to a facsimile machine; a controller coupled to the modem; and, a memory operatively coupled to the controller. The interface includes code to cause the modem to transmit a retrain request to the facsimile machine upon expiration of a given temporal period. The interface includes a circuit for selectively generating a ring signal corresponding to a plain old telephone service ring signal. The interface includes a circuit for selectively generating a hold signal corresponding to a plain old telephone service hold signal. And, the circuit includes code to cause the modem to transmit data indicative of white lines to the facsimile machine upon expiration of a given temporal period.

18 Claims, 9 Drawing Sheets

U.S. PATENT DOCUMENTS

| | | |
|---|---|---|
| 5,778,071 A | 7/1998 | Caputo et al. |
| 6,850,577 B2 | 2/2005 | Li |
| 2001/0033642 A1 | 10/2001 | Abrishami |

OTHER PUBLICATIONS

SOT23 NPN Silicon Planar Medium Power Transistor Data Sheet, Nov. 1995, 3-119-120, Issue 3.

SN54HCT04, SN74HCT04 Hex Inverters Specifications, Jul. 1986, Revised Jul. 2003, Texas Instruments, Dallas, TX.

IRF7350 HEXFET Power MOSFET Data Sheet, Aug. 9, 2001, International Rectifier, El Segundo, CA.

MAX668/MAX669 Constant-frequency, Pulse-width modulating (PWM),current-mode DC-DC controllers Datasheet, 19-4778; Rev. 1; Jan. 2002, Maxim Integrated Products, Sunnyvale, CA.

Power Inductors (SMT Type) Datasheet, 47-48, Sumida.

Fig. 9

INTERFACE FOR FACILITATING FACSIMILE TRANSMISSIONS VIA WIRELESS COMMUNICATIONS NETWORKS

RELATED APPLICATION

This application is a continuation-in-part application of U.S. patent application Ser. No. 11/058,742, filed Feb. 15, 2005, entitled "TELECOMUNICATIONS DEVICE AND METHOD", which is a continuation application of U.S. patent application Ser. No. 10/096,811, filed Mar. 13, 2002, now U.S. Pat. No. 6,856,686 entitled "METHOD AND APPARATUS FOR SECURING E-MAIL ATTACHMENTS", and is a continuation-in-part of U.S. patent application Ser. No. 10/162,800, filed Jun. 5, 2002, now U.S. Pat. No. 6,856,687 entitled "PORTABLE TELECOMMUNICATION SECURITY DEVICE", each of which is a continuation-in-part application of U.S. patent application Ser. No. 09/336,948 Jun. 21, 1999, entitled "STAND-ALONE TELECOMMUNICATIONS SECURITY DEVICE", now U.S. Pat. No. 6,430,691, the entire disclosures of all of which are hereby incorporated by reference as if being set forth in their respective entireties herein.

FIELD OF THE INVENTION

The invention relates generally to facsimile transmission and reception, and more particularly to facsimile transmission and reception via wireless communications networks, like satellite and wireless telephone networks.

BACKGROUND OF THE INVENTION

Figure 1:
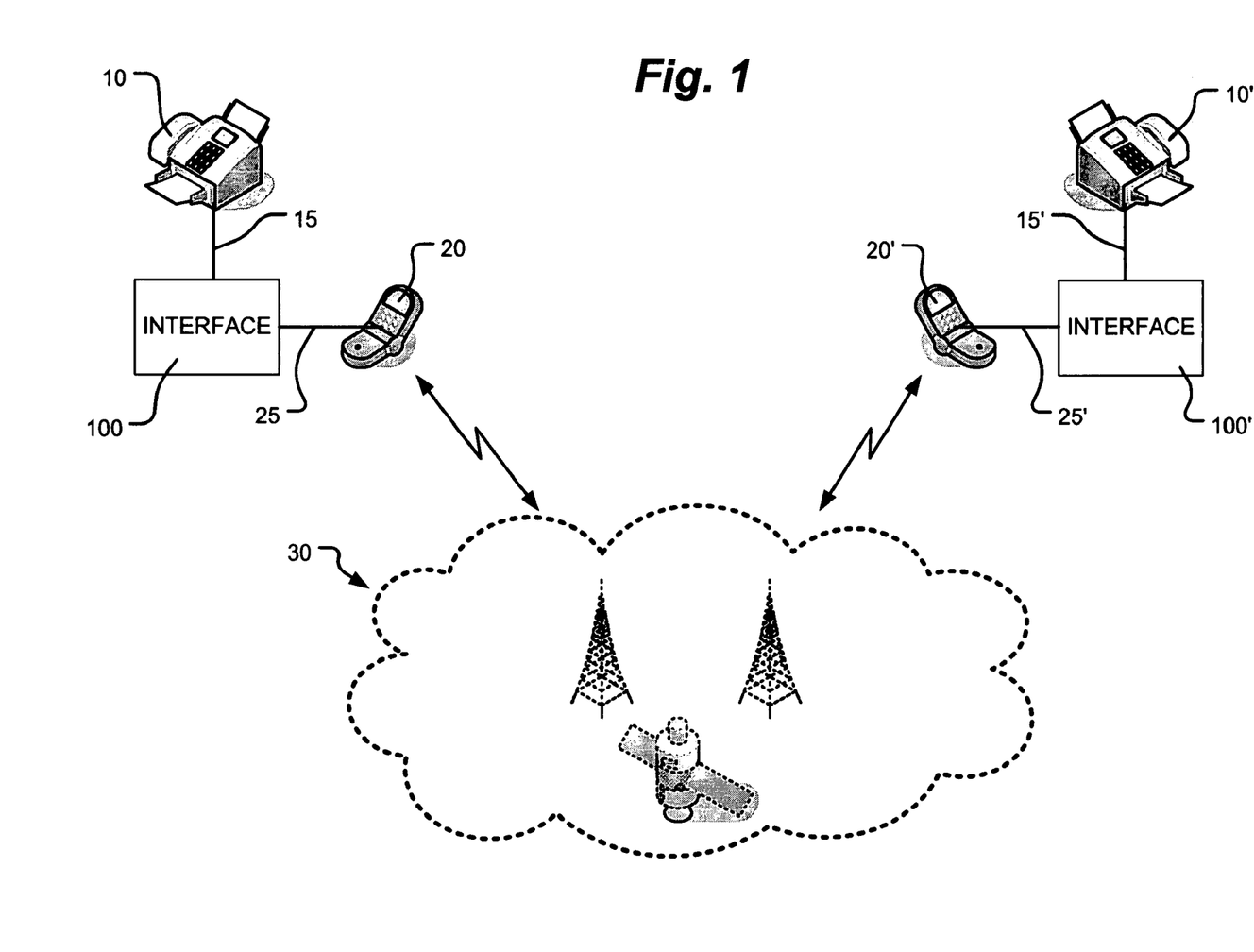
FIG. 1 illustrates a block-diagrammatic view of a communications system according to an aspect of the present invention.

Referring now to FIG. 1, there is shown an exemplary telecommunications medium or network 30, including but not limited to one or more wireless and/or satellite telecommunications networks, for enabling two or more telecommunications devices (20, 20') such as satellite or cellular telephone devices, to communicate with one another. However, these communications experience inherent delays. These delays may result in unsuccessful facsimile communications from one facsimile (fax) machine 10 to another facsimile machine 10'. Difficulties associated with successfully transmitting and/or receiving a facsimile message via a wireless communications network may be exacerbated when attempting to protect transmitted facsimile information, such as through encryption. A device and method for encrypting facsimile transmissions is disclosed in U.S. Pat. No. 6,430,691 entitled "Stand-Alone Telecommunications Security Device" issued to DiSanto, the inventor herein, the subject matter of which is incorporated herein by reference.

For example, a facsimile receiving mechanism, such as facsimile machine 10' will typically time out if no data is received and either stored or printed within a given time interval, such as a minimum 30 second time period after the facsimile machine 10' receiver answers an incoming call. Similarly, a transmitting facsimile mechanism, such as facsimile machine 10, will typically time out between transmission of pages if more than a minimum 30 seconds elapses before the receiving facsimile machine modem is prepared to receive another page after the end of a preceding page. This situation is considerably more likely to occur when encrypting the facsimile data, since setting up the encryption session requires some time before encryption of data is possible and the encryption/decryption processes themselves further require additional processing time associated with encrypting and/or decrypting the data.

Accordingly, it is believed to be desirable to provide a system and method that overcomes the difficulties inherent in the facsimile protocol and permits errorless communication of encrypted or clear-channel data over a wireless communications network, such as a satellite or cellular telephone network.

SUMMARY OF THE INVENTION

An interface for facilitating facsimile transmission via a wireless communications device is operatively connected to a wireless communications network. The interface includes: a modem suitable for being communicatively coupled to a facsimile machine; a controller coupled to the modem; and a memory operatively coupled to the controller. The interface includes code being stored in the memory and operable by the controller to cause the modem to transmit a retrain request to the facsimile machine upon expiration of a given temporal period. According to one aspect, the interface includes a circuit for selectively generating a ring signal corresponding to a plain old telephone service ring signal, and being suitable for being operatively coupled to and communicating with the facsimile machine. According to another aspect, the interface includes a circuit for selectively generating a hold signal corresponding to a plain old telephone service hold signal, and being suitable for being operatively coupled to and communicating with the facsimile machine. In yet another aspect, the circuit further includes code being stored in the memory and operable by the controller to cause the modem to transmit data indicative of white lines to the facsimile machine upon expiration of a given temporal period.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and.

DETAILED DESCRIPTION OF THE PREFERRED EMBODIMENTS

It is to be understood that the figures and descriptions of the present invention have been simplified to illustrate elements that are relevant for a clear understanding, while eliminating, for the purpose of clarity, many other elements found in typical facsimile, encryption and wireless communications methods and systems. Those of ordinary skill in the art may recognize that other elements may be desirable in implementing the present invention. However, because such elements and steps are well known in the art, and because they do not facilitate a better understanding of the present invention, a discussion of such elements is not provided herein.

Referring now to the figures, wherein like references refer to like elements and steps according to the instant invention, FIG. 1 illustrates a telecommunications system configuration which includes interface devices 100, 100' according to an aspect of the present invention. For sake of explanation, the following discussion will utilize a prime (') description for those elements and steps relating to a second like device.

Referring still to FIG. 1, a first user at a first location has access to a first facsimile machine 10, interface 100 and wireless communications device 20. "Wireless communications device", as used herein, refers generally to a cellular or satellite telecommunications network end node, such as a satellite (sat)-phone or cell-phone. Each device 20 can communicate with other devices via wireless communications network 30. In the case of a cellular phone, the system may take the form of an Advance Mobile Phone Service (AMPS). Conventional cellular systems include Global System for Mobile Communications (GSM) and Code Division Multiple Access (CDMA) based systems. In the case of a satellite phone, the device communicates with a satellite constellation that provides the necessary wireless communications link. Both cellular and satellite phones are commercially available from a number of providers, including, by way of non-limiting example only, Nokia, Motorola, Samsung, LG and Qualcomm.

FIG. 1 further illustrates the case wherein the first user may communicate via device 20 and network 30 with a second user having a wireless communications device 20' analogous to device 20. The wireless communications device 20' is operatively coupled to a second facsimile machine 10' via interface device 100'. The first user's facsimile machine 10 can be interconnected to the second user's facsimile 10' using the wireless communications medium 30. Other systems may be used in addition to a cellular and/or satellite phone system to provide for end-to-end connectivity, including, for example, a conventional public switched telephone network ("PSTN") and/or a computer network, such as the global interconnection of computers and computing networks commonly referred to as the Internet.

In one configuration, each facsimile machine 10, 10' is respectively, communicatively coupled to a corresponding one of interface devices 100, 100' via internal modulators/demodulators (MODEMs). Each of Interface devices 100, 100' may respectively be communicatively coupled to a corresponding one of devices 20, 20' via a communications port or interface, such as serial interface or other general purpose electronic interface port, like those conventionally provided on cellular and/or satellite telephones.

Figure 2:
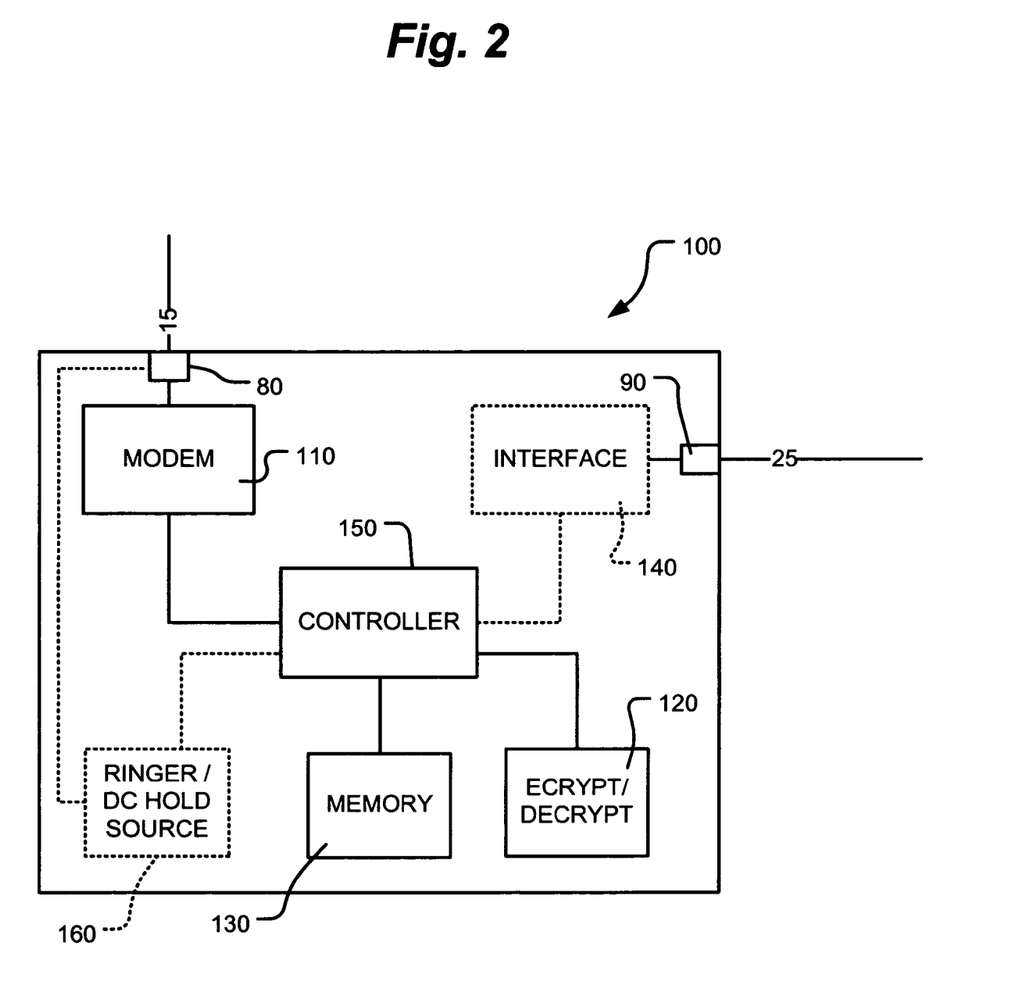
FIG. 2 illustrates a block-diagrammatic view of a telecommunications device according to an aspect of the present invention.

Referring now also to FIG. 2, there is shown a block diagrammatic view of an interface device 100 for enabling communications between sending and receiving facsimile (fax) machines over a communications network according to the present invention. Preferably device 100 includes at least two input/output (I/O) ports 80, 90. In an exemplary embodiment of the present invention, I/O port 80 comprises a phone line port and I/O port 90 comprises a data port. The phone port 80 may take the form of a standard RJ-11 type port, however other configurations may be adopted. The phone line port 80 is well adapted to be coupled to a conventional phone line port of facsimile machine 10. Data port 90 may take the form of a serial I/O port, such as an RS-232 port adapted to permit direct communications between the communications device 20 and interface device 100. However, other suitable interfaces compatible with those available on cellular or satellite phones may of course be utilized, such as an interface that allows for a wireless protocol to be used to communicate from one local device to another, like that conventionally referred to as "Bluetooth". Such an interface may use the 2.4 GHz electromagnetic spectrum to communicate a 1 megabit connection between two devices to provide a data channel, for example. Port 80 may be used to provide operative connectivity to facsimile machine 10 via communications link 15, while port 90 may be used to provide operative connectivity with communications device 20 via communications link 25.

Device 100 includes a modem 110 coupled to interface port 80. Modem 110 may be well suited to communicate with a modem associated with facsimile machine 10. For example, it may support at least 56K and be v.90 compatible as will be understood by those possessing an ordinary skill in the pertinent arts. Modem 110 may be adapted to communicate with a device attached to the phone port 80, such as facsimile machine 10.

Device 100 further includes an encryptor/decryptor 120. Encryptor/decryptor 120 serves to encrypt and/or decrypt data consistent with encryption/decryption codes that may be provided by a Digital Signal Processor (DSP) for example, as is well understood by those of ordinary skill in the pertinent arts.

Device 100 further includes memory 130. "Memory", as used herein, refers to one or more devices capable of storing data, such as in the form of chips, tapes or disks. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. The memory utilized may be internal or external to an integrated unit including a processor. Memory 130 preferably stores a computer program, e.g., a sequence of instructions being operable by a processor.

Device 100 may optionally include an interface 140. Interface 140 may serve to connect a microcontroller 150 with, or allow a microcontroller to interact, via port 90. For example, interface 140 may take the form of a Bluetooth interface. Interface 140 may optionally be omitted where microcontroller 150 is adapted to interface directly with port 90.

Microcontroller 150 may be operatively coupled to the modem 110, data port 90 (optionally via interface 140), encryptor/decryptor 120 and memory 180. Microcontroller 150 may serve to control and pass data to and from these modules. "Microcontroller", as used herein, refers generally to a device including a processor. "Processor", as used herein, refers generally to a computing device including a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. Microcontroller 150 may take the form of a model 80C251, by way of non-limiting example only.

According to an aspect of the present invention, interface device 100 may take the form of the security/interface device described in U.S. Pat. No. 6,430,691, but including the functionality as described herein and with reference to the associated figures.

For non-limiting purposes of explanation only, the present invention will be further described as it relates to a facsimile transmission from facsimile machine 10 to facsimile machine 10' via a satellite or cellular communications medium 30, where both facsimile machines 10, 10' are provided connectivity through a cellular or satellite telephone 20, 20', respectively. As set forth, it is desirable that the first user and second user efficiently communicate a facsimile transmission from facsimile 10 to facsimile 10' over the network 30.

Figure 3:
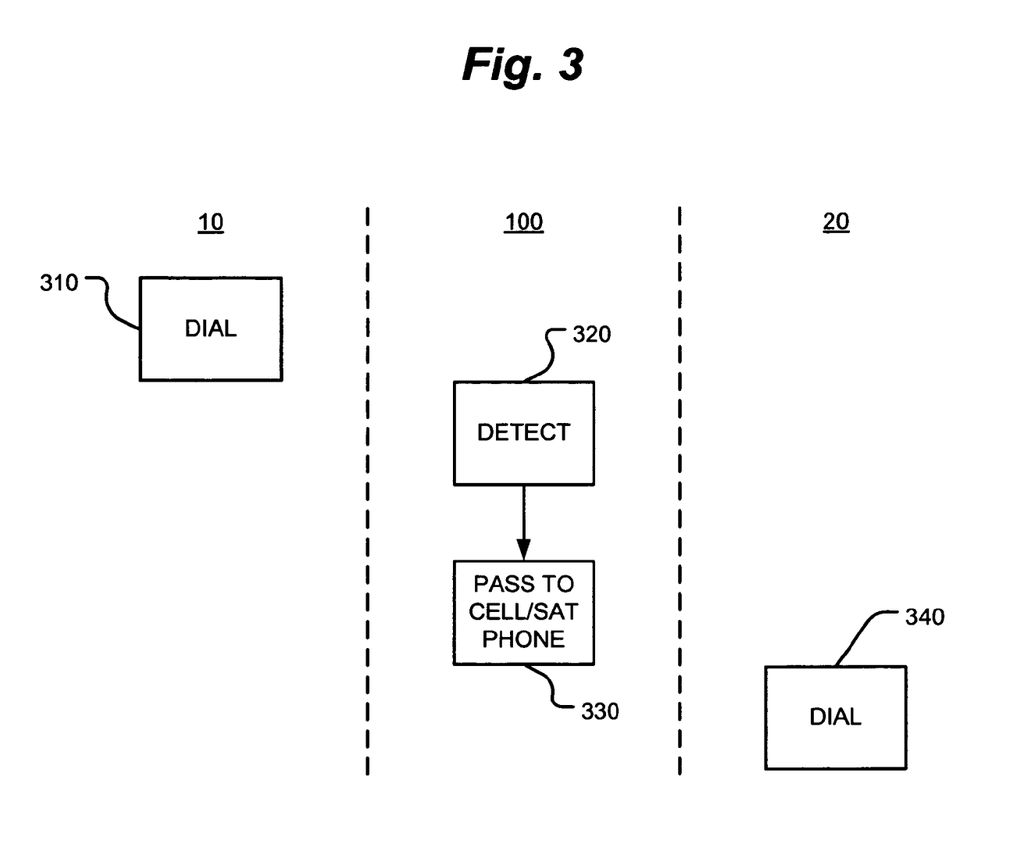
FIGS. 3–7 illustrates block-diagrammatic representations of processes according to aspects of the present invention, respectively.

Referring to FIG. 3 in conjunction with FIGS. 1 and 2, there is shown a process according to an aspect of the present invention. When initiating a facsimile transmission from machine 10 to 10' via wireless telephone 20, the telephone number being called may be dialed (block 310), using for example, a keypad on the transmitting facsimile machine 10. The dialed number is communicated to facsimile modem 110 in device 100 connected to the RJ-11 output of the facsimile machine via link 15. The dialed number may be detected (block 320) by appropriate detection circuitry in modem 110 and controller 150, and provided (block 330) to wireless/satellite telephone 20 via port 90 and communications link 25, which in turn dials (block 340) via appropriate control circuitry, to the target receiving facsimile machine 10' through the wireless network 30. For non-limiting purposes of explanation, the dialed number corresponds to device 20'.

Figure 4:
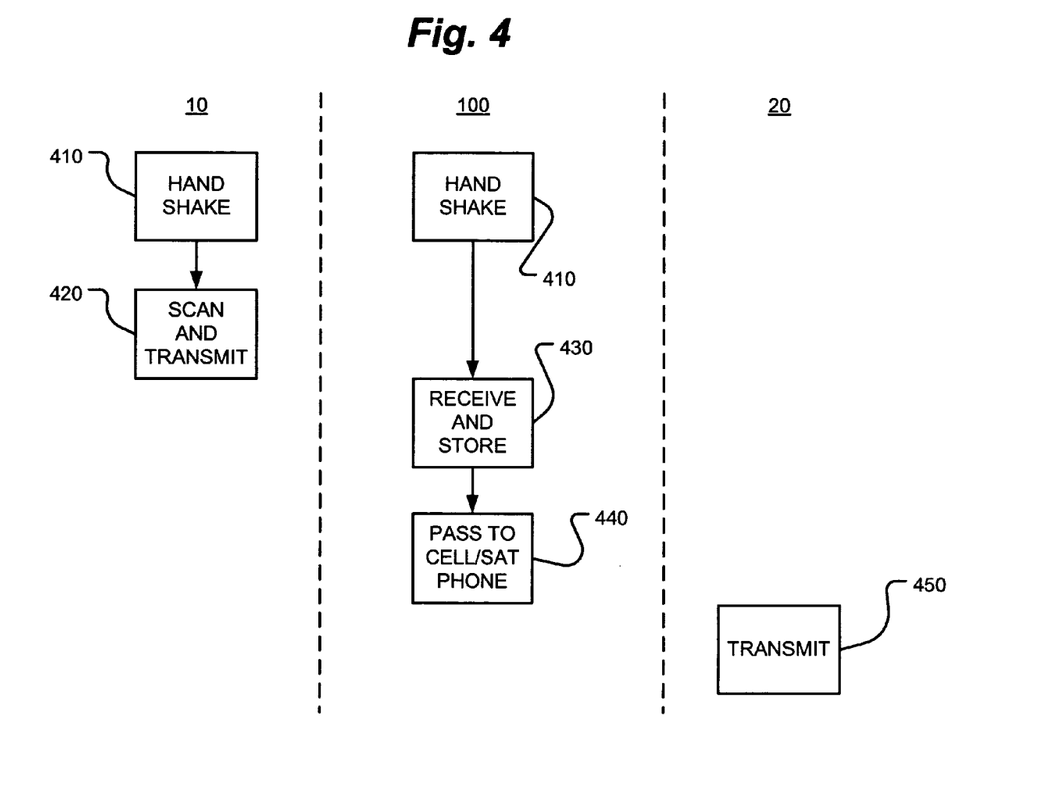

Referring now also to FIG. 4, there is shown a process according to an aspect of the present invention. Therein, the transmitting facsimile machine 10 fax modem handshakes (block 410) with the fax modem 110 in the device 100 to establish the communications session. When the facsimile protocol is established, facsimile machine 10 starts scanning (block 420) the document to be transmitted, and sends the scanned information to fax modem 110, which receives and stores (block 430) the data in memory 130. The data stored (block 430) is passed (block 440) to cell/sat phone 20 for transmission from phone 20 (block 450) via network 30. The data is encrypted using encryptor/decryptor 120 prior to being passed 440 to device 20. The rate at which information is transmitted from the facsimile machine 10 to modem 110 may be greater, less than or equal to the rate at which data is passed into or out of memory 130.

Figure 5:
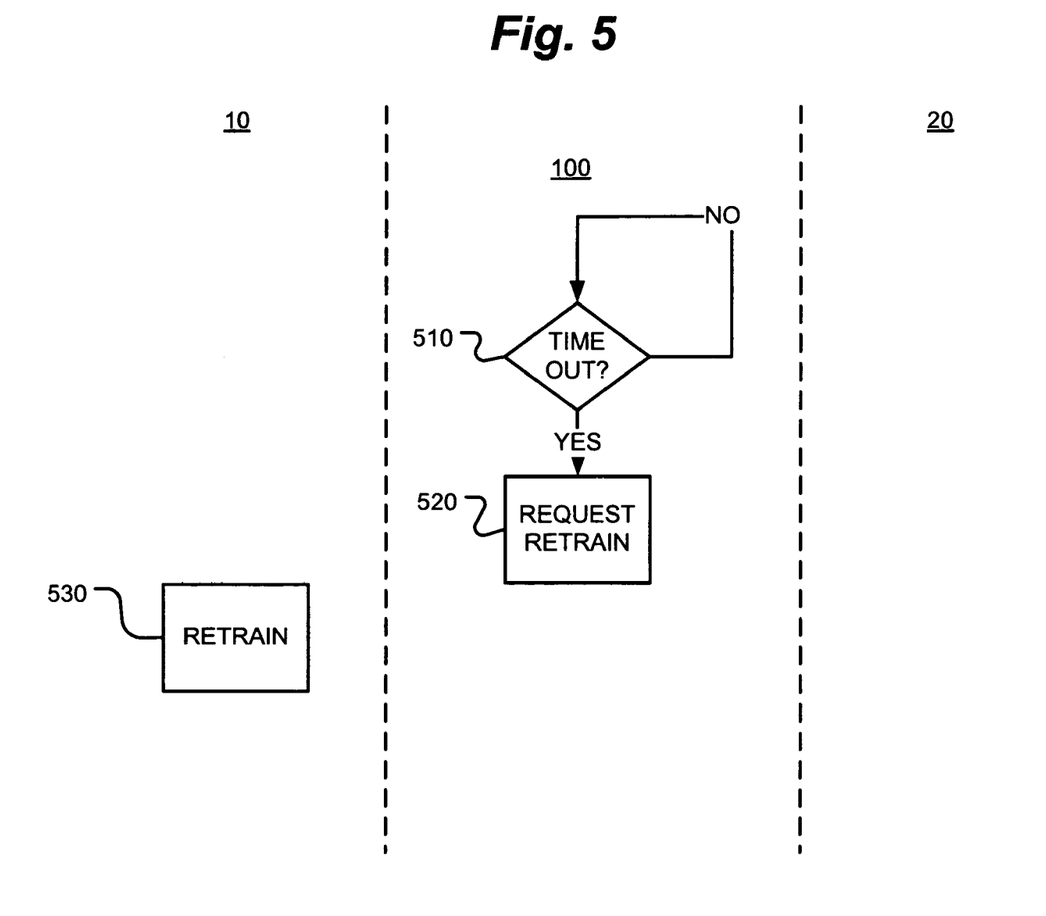

Referring now also to FIG. 5, there is shown a process for reducing the occurrence of an unwanted timeout during facsimile transmission/reception according to an aspect of the present invention. If data stored 430 in memory 130 is not passed 440 and/or transmitted 450, after encryption, through the network 30 to the receiving unit quickly enough for the transmitting fax machine 10 to scan the next document (e.g. the next page), a timeout may conventionally occur at facsimile machine 10. In an exemplary embodiment, the transmitting fax machine 10 continues to send sequential fax messages without waiting for the receiving fax modem 110 in interface unit 100 between the fax machine and the cellular/satellite phone 20 to send an "OK" response message. The transmitted fax information is stored in memory 130, such as a memory buffer. The memory buffer may be sized so as to accommodate around 64 Kbytes, for example. When the memory buffer approaches a "wrap around" limit, the fax modem 110 transmits a "retrain" signal to transmitting fax machine 10 to slow down the data being received from the transmitting fax machine and thereby prevent a time-out from occurring. This may be accomplished by comparing conventional buffer read and write pointers, for example. When a difference between these pointers indicates a buffer wrap-around is coming, modem 110 may transmit a Retrain Positive (RTP) signal to fax machine 10, for example. Of course, other retrain commands, such as a Retrain Negative (RTN) signal may be used. Either way, upon receiving the retrain request signal, fax machine 10 and modem 110 undertake certain predefined steps (such as passing or re-negotiating communications parameters) that take a certain amount of time, and then continue the communications session there-between. According to an aspect of the present invention, the parameters of the communications session between fax machine 10 and modem 110 may be substantially the same after the retrain and before the retrain. Alternatively it may be different. Either way however, according to an aspect of the present invention, the transmitting fax machine 10 may be prevented from timing out. According to an aspect of the present invention, this may be considered a "streaming fax", for example.

According to an aspect of the present invention, device 100' may be used to facilitate reception of facsimile transmissions via a satellite/cellular phone as well. According to an aspect of the present invention, target receiving facsimile machine 10' may be connected to a wireless/satellite telephone 20' via an interface device 100'. In such a case, there is no "ring" signal or DC "hold" current, as is conventionally found in landline telephone systems (i.e., PSTN's). In general, fax machine 10' may require a ring signal and/or line current be received to activate it. When device 100 (or 100') receives a "ring" signal through its serial port from device 20 (or 20') a ring signal is generated and sent to fax machine 10 (or 10'). The fax machine automatically answers and goes "off hook". At this time, device 100 (or 100') terminates the ring signal and generates a line current.

According to an aspect of the present invention, and referring again to FIG. 2, device 100 includes a ringer and/or DC hold current source 160. Source 160 may be operatively coupled to controller 150 and port 80. According to an aspect of the present invention, source 160 includes a ring generator. Source 160 further includes a DC hold current source.

Figure 6:
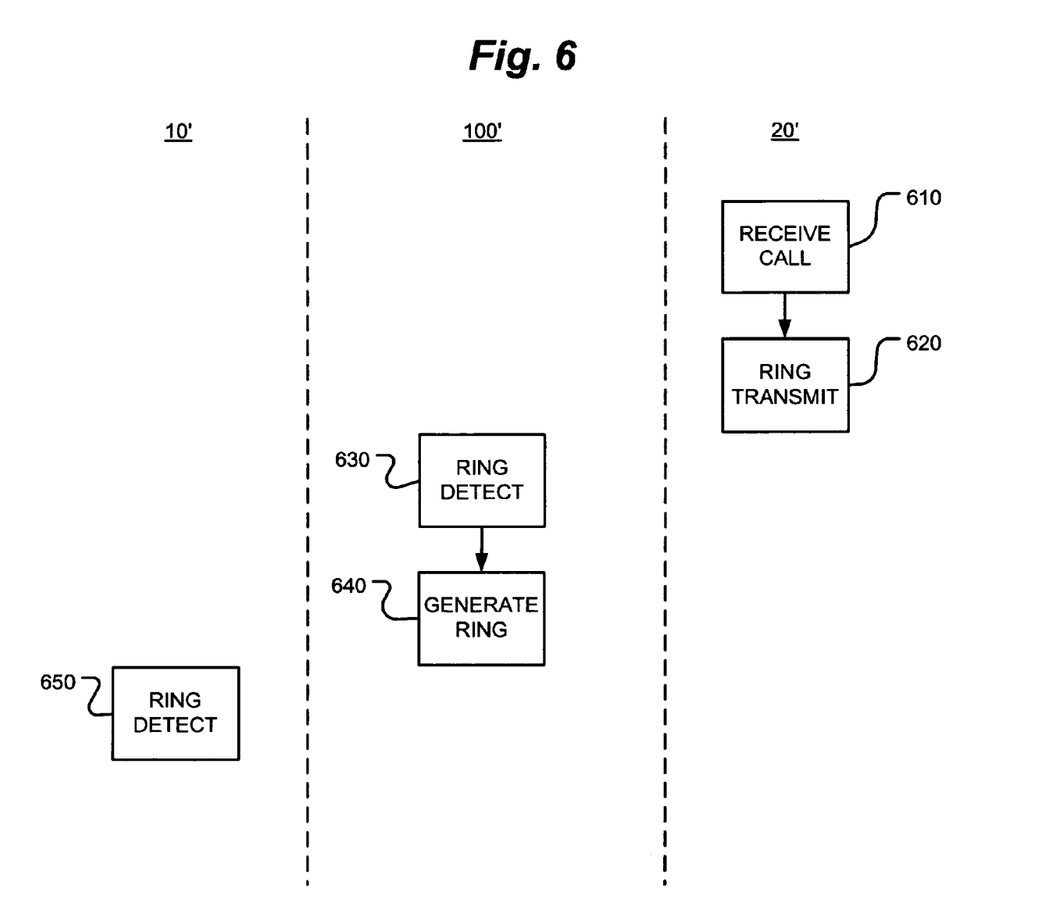

Referring now also to FIG. 6, there is shown an exemplary process flow according to an aspect of the present invention. When the wireless/satellite telephone 20' receives a call (block 610), a corresponding word or data, such as "RING", is sent (block 620) to device 100' via communications link 25' and port 90'. This capability may be inherent to telephone 20'. For example, telephone 20' may have code that may be activated to detect an incoming call, and send predefined data to a data port thereof in response—similar to activating a display of the telephone to reflect that a call is incoming, for example.

Microcontroller 150 detects this word or data (block 630), such as by "seeing" the word "RING" on port 90 and in response to the detection activates the ring generator (block 640). The ring generator provides a ring signal similar to the ring signal which exists on a land line, for example. Responsively thereto, facsimile machine 10' detects the generated ring (block 650) and goes "off hook". By way of non-limiting example only, the ring signal generated (block 640) and detected (block 650) may be on the order of a 20 Hertz (Hz), 50 volt root-mean-square (VRMS) signal provided on port 80.

Figure 7:
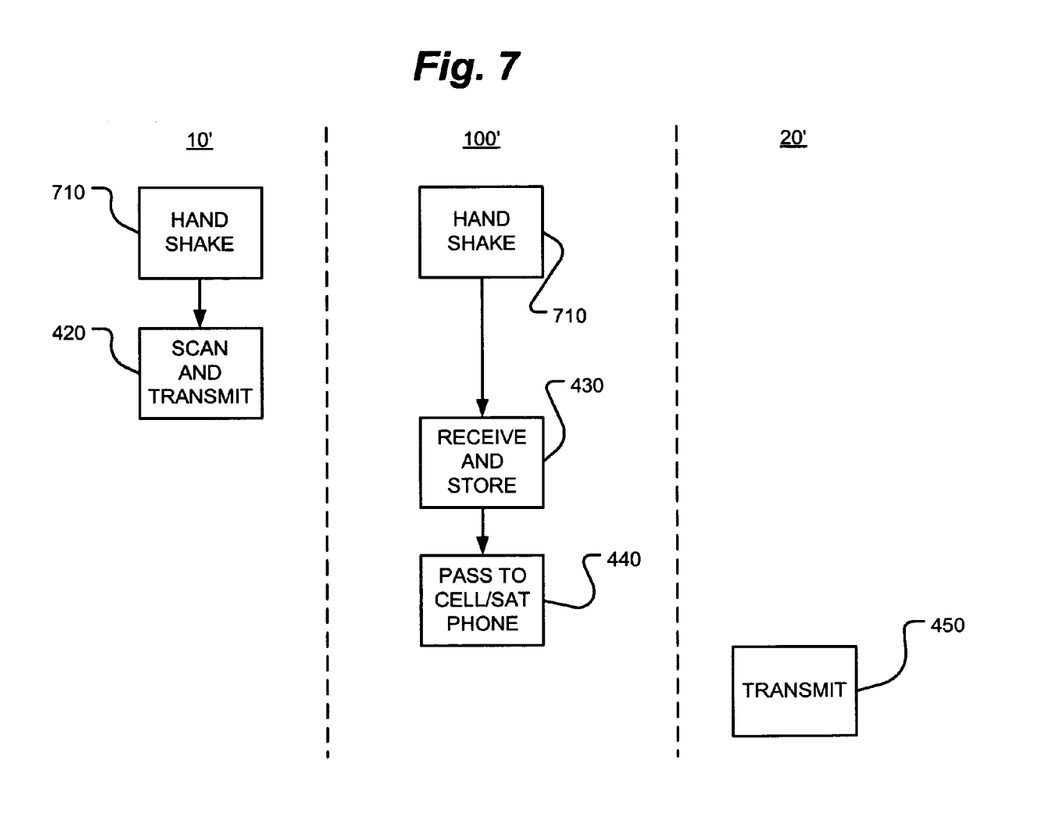

Referring now also to FIG. 7, there is shown another exemplary process flow according to an aspect of the present invention. When facsimile machine 10' goes off hook, it starts a fax handshake (block 710) with fax modem 110'. Machine 10' may go off hook in response to a "ring signal" being provided by generator 160, for example. When the fax handshake is completed, the timeout period of the receiving fax machine starts and the receiving fax machine 10' may conventionally timeout in about 30 seconds if data is not received. This time may generally be much less that the time required to start receiving data, considering the delay inherent to communications network 30 and the time required for setting up an optional encryption session. Such delays occurring within the system may result in an undesired system failure.

In order to mitigate the risk of such a failure occurring, modem 110' and controller 150' are adapted to cause the receiving fax machine 10' to print "white lines", which simulate printing received data until received data is actually available. For example, microcontroller 150 may cause a signal indicative of white spaces to be provided on port 80, thereby causing facsimile machine 10' to print white lines. In an exemplary embodiment, after the receiving fax machine goes "off hook" and the fax machine modem and the 100' fax modem have completed the "handshake" (which time interval may be on the order of about 15 seconds) a signal from controller 150' onto port 80 causes the fax machine to initiate printing of "white lines" to mitigate the risk of fax machine 10' prematurely returning to an on-hook condition as a result of a time-out. When received data is ready to be sent to machine 10' from modem 100', such as when a predetermined buffer fullness is reached, the white line inducing signal may be ceased and the received data sent. Optionally, other signals may be interposed, such as a signal to induce a page-break or next page functionality in fax machine 10'.

Further, since there is a delay between the scanning of the documents at the transmitting machine 10 and the printing of the documents at the receiving machine 10', the transmitting fax machine 10 completes its task before the receiving machine 10' completes printing all of the transmitted information. According to an aspect of the present invention, the risk of communications failure may be mitigated by preventing the transmitting machine 10 from going "on hook" or standby until the receiving machine goes "on hook" and the transmitting machine senses "no carrier". To accomplish this, in the case of a facsimile transmission from fax machine 10 to fax machine 10' via devices 100, 100', 20, 20' and medium 30, a DC hold current analogous to that conventionally used in PSTNs may be provided on line 15 by device 100 until a "no carrier" signal is received by phone 20, passed to device 100 via port 90 and detected by device 100 (e.g., microcontroller 150). The DC hold current is generated by device 100.

Figure 8:
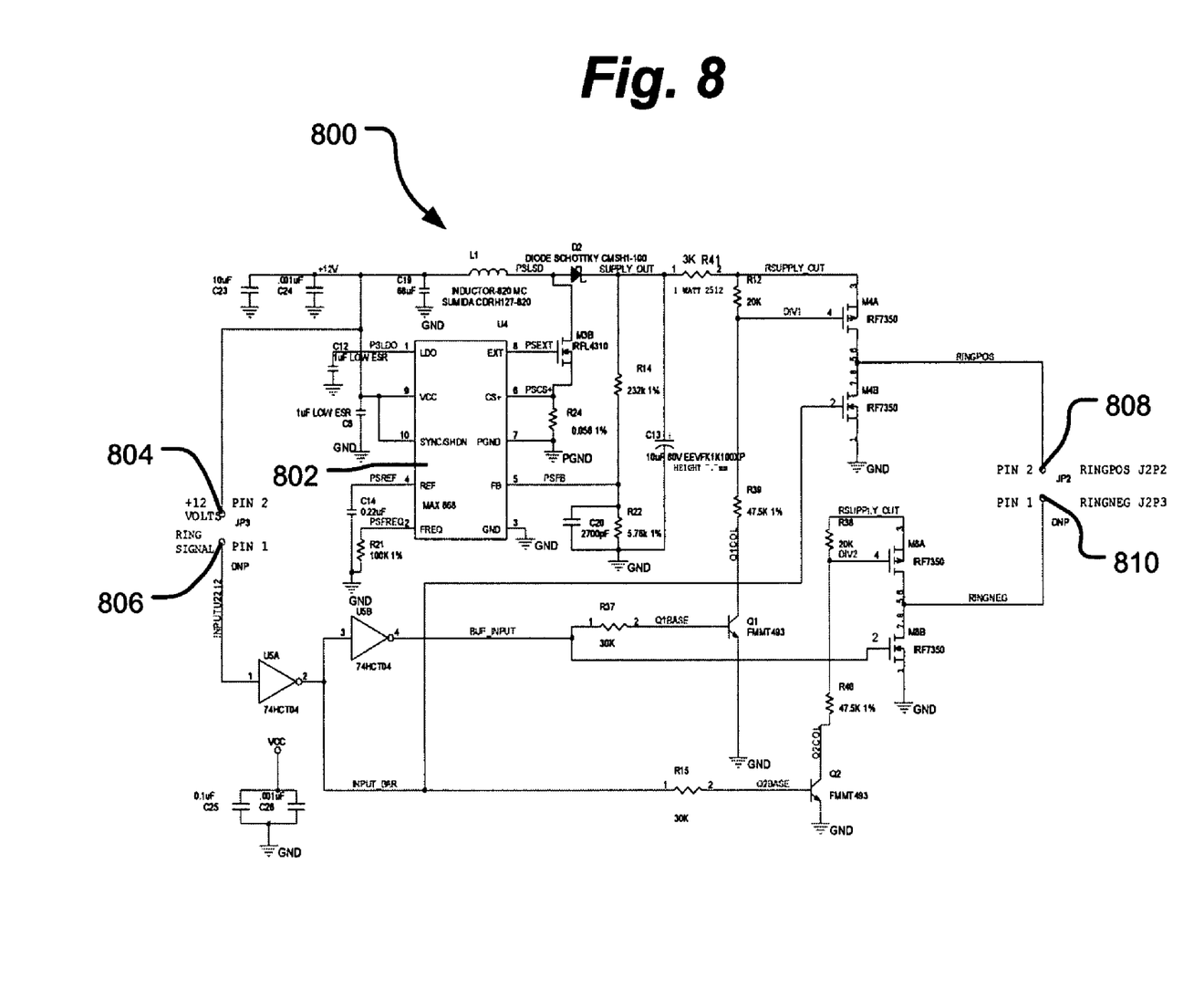
FIG. 8 illustrates a schematic representation of a ring generation circuit according to an aspect of the present invention; and, FIG. 9 illustrates a schematic representation of a DC hold current generation circuit according to an aspect of the present invention.

Referring now also to FIG. 8, there is shown a schematic diagram of a circuit suitable for use as a ring generator according to an aspect of the present invention. The circuit of FIG. 8, and the specific elements thereof, are provided for non-limiting purposes of illustration only. Of course, other circuits and/or circuit components may be used.

Circuit 800 includes a DC-DC controller 802, such as a MAX668 1.8 to 28 V pulse-width modulating (PWM), current-mode DC-DC controller. The DC-DC controller may be configured in a non-bootstrapped manner. Circuit 800 includes a +12V DC input (804). The "ring signal" input (806) controls the field effect transistors (FETs) through U5A and U5B to generate the ring signal (≈50 VAC) to activate the receiving fax machine. Circuit 800 provides an output analogous to a PSTN land-line "ring" signal, across terminals 808, 810.

Positive input terminal 804 is coupled to ground across capacitors C6, C19, C23 and C24. Capacitor C6 is 1 µF, capacitor C19 is 68 µF, capacitor C23 is 10 µF, and capacitor C24 is 0.001 µF. Terminal 804 is also coupled to VCC and SYNC inputs of controller 802. Terminal 804 is also coupled to a power inductor L1. Inductor L1 is a model CDRH127–820 available from Sumida.

Terminal 806 is coupled to an input of an inverter U5A, having an inverting output coupled to the input of another inverter U5B. Inverters U5A and U5B are each a Texas Instruments model SN74HCT04D hex inverter. The inverting output of U5A is also coupled to the base terminal of transistor Q2, having an emitter terminal coupled to ground, via a 30KΩ resistor R15. Transistor Q2 takes the form of a Zetex model FMMT493 NPN silicon planar power transistor.

The inverting output of inverter U5A is also coupled to the gate terminal of a MOSFET M4B having the substrate and source terminal coupled to ground. A drain terminal of MOSFET M4B is coupled to a source terminal of a MOSFET M4A and output terminal 808. The substrate, source and gate terminals of MOSFET M4A are coupled together through a 20KΩ resistor R12. The gate terminal of MOSFET M4A is also coupled to the collector terminal of transistor Q1 via 47.5KΩ resistor R39. MOSFETs M4A and M4B are each International Rectifier models IRF7350.

The inverting output of inverter U5B is coupled to the base terminal of a transistor Q1, having an emitter terminal coupled to ground, through a 30KΩ resistor R37, and to a gate terminal of a power MOSFET M6, having substrate and source terminals coupled to ground. Transistor Q1 is also a Zetex model FMMT493 NPN silicon planar power transistor. A drain terminal of MOSFET M6B is coupled to the source terminal of a MOSFET M6A and output terminal 810. The substrate, source and gate terminals of MOSFET M6A are coupled together through a 20KΩ resistor R38. The gate terminal of MOSFET M6A is also coupled to the collector terminal of transistor Q2 via 47.5KΩ resistor R40. MOSFETs M6A and M6B are each International Rectifier models IRF7350.

Inductor L1 is also coupled to the source terminal of MOSFET M4A via a Diode Barrier Rectifier D2 and 3KΩ resistor R41. The junction of diode D2 and resistor R41 are in turn coupled to a 5.76KΩ resistor R22 though a 232KΩ resistor R14. The junction of diode D2 and resistor R41 are also coupled to reference potential (e.g. GND) through a 10 µF capacitor C13. Capacitor C20 (2700pF) is in parallel with Resistor R22. Resistor R22 is in turn coupled to ground. The junction of resistors R14, R22 and capacitor C20 are also coupled to a feedback input terminal of controller 802. Resistor R22 and capacitor C20 compensate for the ESR resistance of C13 and capacitance of C13.

A low dropout (LDO) terminal of controller 802 is coupled to ground through capacitor C12 (1 µF). Ground terminal of controller 802 is grounded. Reference output and frequency set input terminals of controller 802 are coupled to ground, via a 0.22 µF capacitor C14 and 100KΩ resistor R21, respectively. The power ground terminal of controller 802 is coupled to ground. The positive current sense input is coupled to the power ground via a 0.056 Ω resistor R24. The external MOSFET output terminal of controller 802 is coupled to the gate terminal of MOSFET M3B, having substrate and source terminals coupled to the current sense input of controller 802. The drain terminal of M3B is coupled to the junction of inductor L1 and diode D2. Voltage Vcc is capacitively coupled to ground using a 0.1 µF capacitor C25 and 0.001 µF capacitor C26, configured in parallel.

Figure 9:
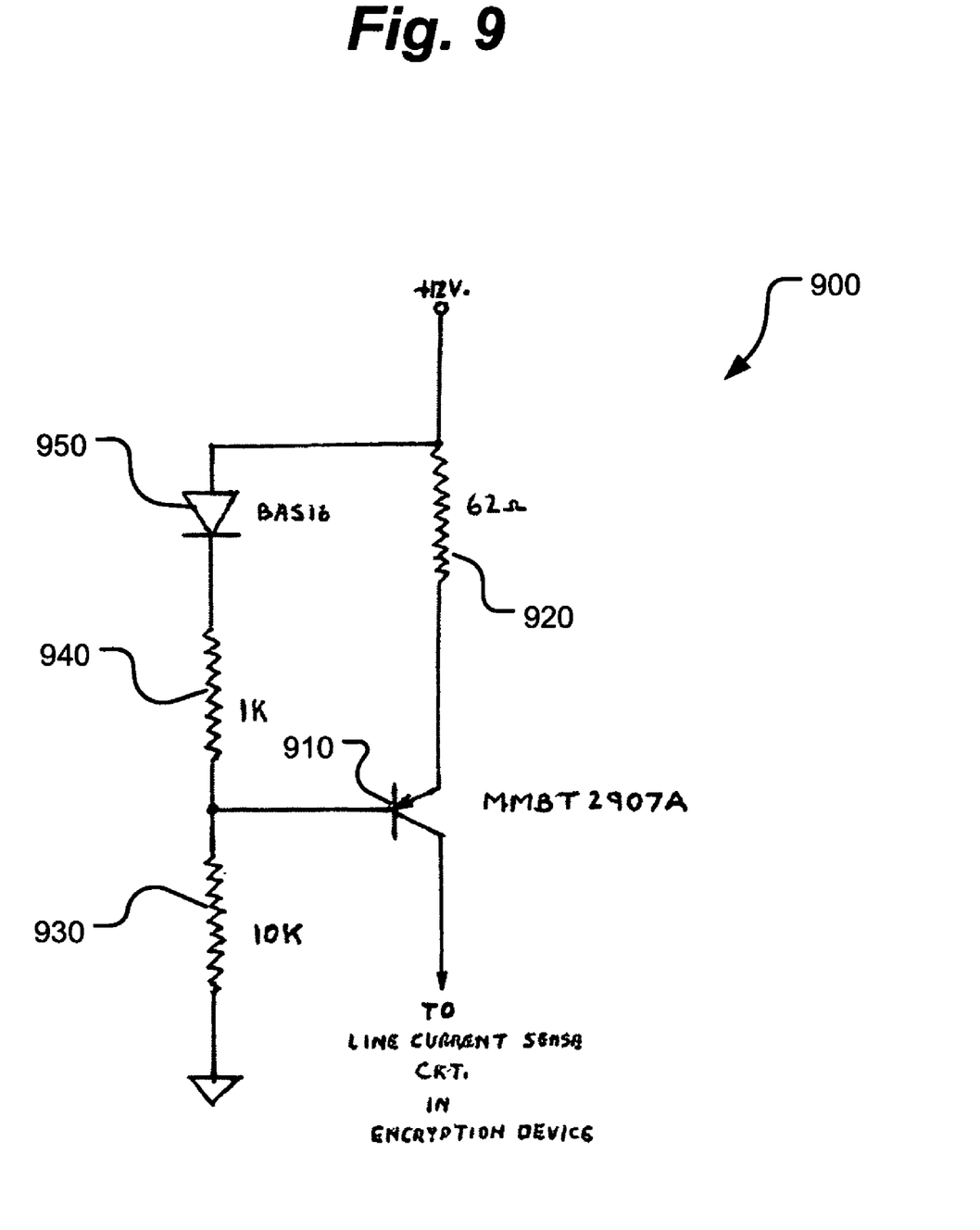

Referring now also to FIG. 9, there is shown a schematic diagram of a circuit suitable for use as DC hold current source according to an aspect of the present invention. Like the circuit of FIG. 8, the circuit of FIG. 9, and the specific elements thereof, are provided for non-limiting purposes of illustration only. Of course, other circuits and/or circuit components may be used.

Circuit 900 of FIG. 9 includes a transistor 910 having an emitter terminal coupled to a +12 volt (V) source through a first resistor 920. The collector terminal of transistor 910 provides the line current. The base terminal of transistor 910 is coupled to ground through resistor 930 and the +12V source through resistor 940 and diode 950.

According to an aspect of the present invention, transistor 910 may take the form of a model MMBT2907A, which is commercially available. Resistor 920 may be 62 Ω, where resistor 930 is 10 kΩ and resistor 940 is 1 kΩ. Diode 950 may take the form of a biased BAS16, which is commercially available.

According to an aspect of the present invention, the communications network that provides end-connectivity for a device 20, 20' may be a Plain Old Telephone Service (POTS) line, such that a ring generator and/or DC current source are not required. As will be recognized by those possessing an ordinary skill in the pertinent arts though, the transmit and receive functionality may be treated in a same manner as in the case of the terminal associated with the cellular/satellite telephone, as the same delays will be encountered where a cellular and/or satellite network is included in medium 30.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. For example, while specific circuit configurations and values have been illustrated, it is recognized that such values and configurations are exemplary, and that other values and/or configurations may be utilized within departing from the spirit and scope of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. An interface for facilitating facsimile transmission via a wireless communications device operatively connected to a wireless communications network, said interface comprising:
    a modem suitable for being communicatively coupled to a facsimile machine;
    a controller coupled to said modem;
    a memory operatively coupled to said controller; and,
    code being stored in said memory and operable by said controller to cause said modem to transmit a retrain request to said facsimile machine upon expiration of a given temporal period.

2. The interface of claim 1, wherein said temporal period is less than a transmission timeout period of said facsimile machine.

3. The interface of claim 1, wherein said temporal period initiates after a handshake between said modem and said facsimile machine.

4. The interface of claim 1, wherein said temporal period is about 30 seconds.

5. The interface of claim 1, wherein said temporal period is less than a reception timeout period of said facsimile machine.

6. The interface of claim 1, wherein said temporal period initiates after a handshake between said modem and said facsimile machine.

7. The interface of claim 1, wherein said temporal period is about 30 seconds.

8. An interface for facilitating facsimile reception via a wireless communications device being suitable for communicating via a wireless communications network, said interface comprising:
    a modem suitable for being operatively coupled to and communicating with a facsimile machine;
    a circuit for selectively generating a ring signal corresponding to a plain old telephone service ring signal, and being suitable for being operatively coupled to and communicating with said facsimile machine;
    a controller coupled to said modem and circuit;
    a memory being operatively coupled to said controller; and,
    code being stored in said memory and operable by said controller to cause said circuit to generate and transmit said ring signal corresponding to a plain old telephone service ring signal to said facsimile machine upon detecting a signal indicative of said wireless communications device receiving a call.

9. The interface of claim 8, wherein said signal indicative of said wireless communications device receiving a call corresponds to a given data word.

10. The interface of claim 8, wherein said wireless communications device is selected from the group consisting of a cellular phone and a satellite phone.

11. The interface of claim 8, wherein said ring signal is a 20 Hz 50 VRMS AC signal.

12. The interface of claim 8, wherein said circuit comprises a non-bootstrapped pulse-width modulating, current-mode DC-DC controller.

13. The interface of claim 8, wherein said circuit comprises a transistor having a gate coupled through a resistance and diode to a power source.

14. An interface for facilitating facsimile reception via a wireless communications device being suitable for communicating via a wireless communications network, said interface comprising:
    a modem suitable for being operatively coupled to and communicating with a facsimile machine;
    a circuit for selectively generating a ring signal corresponding to a plain old telephone service hold signal, and being suitable for being operatively coupled to and communicating with said facsimile machine;
    a controller coupled to said modem and circuit;
    a memory being operatively coupled to said controller; and,
    code being stored in said memory and operable by said controller to cause said circuit to generate and transmit said ring signal corresponding to a plain old telephone service hold signal to said facsimile machine upon expiration of a given temporal period.

15. The interface of claim 14, wherein said temporal period corresponds to the transmission timeout period of said facsimile machine.

16. The interface of claim 14, wherein said wireless communications device is selected from the group consisting of a cellular phone and a satellite phone.

17. The interface of claim 14, wherein said ring signal is a DC current signal.

18. An interface for facilitating facsimile reception via a wireless communications device being suitable for communicating via a wireless communications network, said interface comprising:
- a modem suitable for being operatively coupled to and communicating with a facsimile machine;
- a controller coupled to said modem;
- a memory being operatively coupled to said controller; and,
- code being stored in said memory and operable by said controller to cause said modem to transmit data indicative of white lines to said facsimile machine upon expiration of a given temporal period.

* * * * *